(No Model.) 2 Sheets—Sheet 1.

N. W. PRATT.
METHOD OF FORMING SERPENTINE TUBES.

No. 337,282. Patented Mar. 2, 1886.

WITNESSES:
Aug Groveling
J. R. Waterbury

INVENTOR
Nathaniel W. Pratt
By Charles W. Forder
Atty.

(No Model.) 2 Sheets—Sheet 2.
N. W. PRATT.
METHOD OF FORMING SERPENTINE TUBES.
No. 337,282. Patented Mar. 2, 1886.
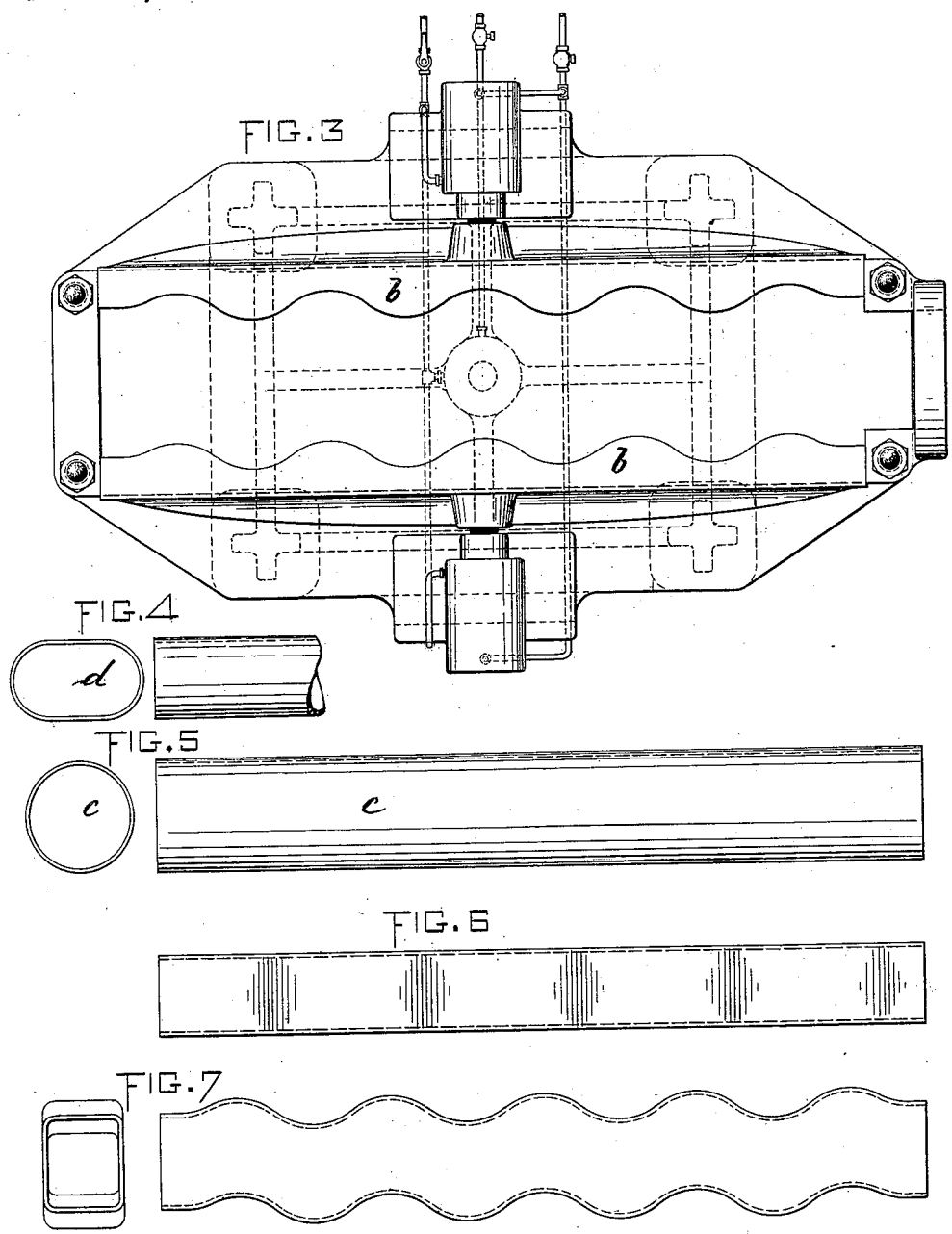

UNITED STATES PATENT OFFICE.

NATHANIEL W. PRATT, OF BROOKLYN, NEW YORK.

METHOD OF FORMING SERPENTINE TUBES.

SPECIFICATION forming part of Letters Patent No. 337,282, dated March 2, 1886.

Application filed November 13, 1885. Serial No. 182,665. (No specimens.)

*To all whom it may concern:*

Be it known that I, NATHANIEL W. PRATT, a citizen of the United States, residing at Brooklyn, in the county of Kings and State of New York, have invented a new and useful Improvement in the Method of Forming Serpentine Tubes, of which the following is a specification, reference being had to the accompanying drawings, forming a part thereof, in which—

Figure 1:
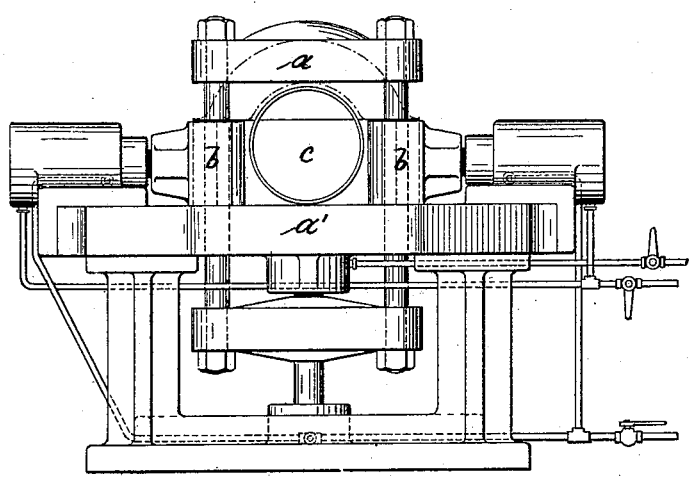
Figure 2:
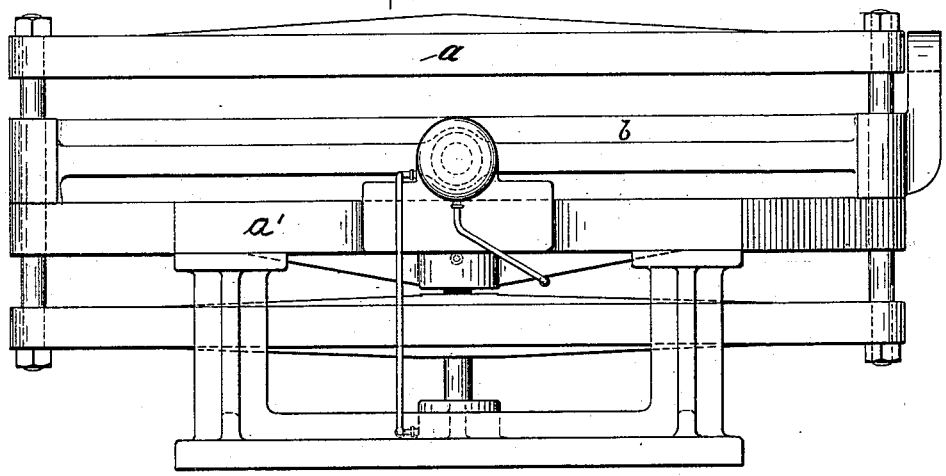

Figure 1 represents an end elevation, Fig. 2 a side elevation, and Fig. 3 a plan view, of a machine with which the method may be practiced. Figs. 4 and 5 are side and transverse views, respectively, of the blank; and Figs. 6 and 7 side, end, and plan views of the completed tube.

Similar letters of reference indicate corresponding parts in the several figures.

The method consists in first subjecting a cylindrical pipe or blank (shown in Fig. 5) to a compression between upper and lower dies, as shown in Figs. 1 and 2, so as to produce an oblong form in cross-section, as shown in Fig. 4, and then by means of side dies to further compress the blank into the serpentine form shown in Figs. 6 and 7. By this method no square corners are formed, and the metal needs only to be rearranged once instead of twice, as heretofore practiced.

The machine represented in the drawings consists of the upper and lower dies, $a\ a'$, and side dies, $b\ b$, which are mounted on a suitable frame-work, and may be operated by means of hydraulic plungers, as shown, or by other well-known means. The upper and lower dies, $a\ a'$, are constructed with plain faces, and act to compress the cylindrical blank $c$ to the oblong form in cross-section, as shown at $d$, Fig. 4, the lower die, $a'$, being fixed or stationary, and the upper die, $a$, movable. The side dies, $b\ b$, are constructed with transverse depressions upon their acting faces, as shown in Fig. 3, that form corresponding depressions in the sides of the blank when operated, and produce the serpentine tube shown in Fig. 7, the action of the side dies, $b\ b$, following the operation of the upper and lower dies, $a\ a'$, that remain compressed and retain the blank until the action of the side dies is completed. It will be understood that a sectional or jointed mandrel corresponding in form to the depressions in the dies is necessarily used to act in conjunction therewith.

Having thus sufficiently described and referred to such essential parts of a machine whereby my invention may be practiced, what I claim, and desire to secure by Letters Patent, is—

The method described of making serpentine tubes, which consists in first compressing a cylindrical tube to an oblong form in cross-section, and subsequently forming transverse depressions therein, as described.

NAT. W. PRATT.

Witnesses:
 CHAS. W. FORBES,
 AUG. CREVELING.